United States Patent
Wolf

[19]

[11] Patent Number: 5,886,996
[45] Date of Patent: Mar. 23, 1999

[54] SYNCHRONOUS DIGITAL COMMUNICATION SYSTEM WITH A HIERARCHICAL SYNCHRONIZATION NETWORK

[75] Inventor: Michael Wolf, Mundelsheim, Germany

[73] Assignee: Alcatel N.V., Rijswijk, Netherlands

[21] Appl. No.: 573,388

[22] Filed: Dec. 15, 1995

[30] Foreign Application Priority Data

Dec. 24, 1994 [DE] Germany ............... 44 46 511.4

[51] Int. Cl.[6] ........................... H04J 3/06
[52] U.S. Cl. ........................... 370/507; 375/356
[58] Field of Search ................. 370/85.13, 94.1, 370/94.2, 60, 60.1, 103, 105.1, 105.2, 85.6, 100.1, 907, 916, 503, 507, 506, 509, 510, 513, 518, 520, 406, 408, 535, 541; 375/354, 356, 359, 365; 359/135, 115, 119, 118, 114, 124

[56] References Cited

U.S. PATENT DOCUMENTS

| | | | |
|---|---|---|---|
| 4,696,019 | 9/1987 | Tulpule et al. | 375/107 |
| 4,933,836 | 6/1990 | Tulpule et al. | 364/200 |
| 4,977,582 | 12/1990 | Nichols et al. | 370/517 |
| 5,185,736 | 2/1993 | Tyrrell et al. | 370/55 |
| 5,291,489 | 3/1994 | Morgan et al. | 370/401 |
| 5,377,209 | 12/1994 | Skinner et al. | 370/105.1 |
| 5,513,184 | 4/1996 | Vannucci | 370/105.1 |
| 5,675,580 | 10/1997 | Lyon et al. | 370/250 |

FOREIGN PATENT DOCUMENTS

| | | |
|---|---|---|
| 3916850 | 12/1990 | Germany . |
| 4012762 | 10/1991 | Germany . |
| 4408760 | 9/1994 | Germany . |

OTHER PUBLICATIONS

"Synchrone Digitalhierarchie und Asynchroner Transfermodus", O. Fundneider, *Telekom Praxis*, Apr. 1994, pp. 29–36.

"More on Synchronization Status Message Problems", B. Neihoff, *ETSI TM3/WG6*, Oslo 25–29 Oct.

"Synchronization and Timing of SDH Networks", W. Powell et al, *Electrical Communication* (Alcatel), 4th Quarter 1993, pp. 349–358.

"A Technical Report on Synchronization Network Management Using Synchronization Status Messages", *Committee T1—Telecommunications Report No. 33*, Apr. 1994, pp. 1–34.

"Network Timing/Synchronization for Defense Communications", H. Stover, *IEEE Transactions on Communications*, vol. COM–28, No. 5, Aug. 1980, pp. 1234–1244.

"BT Northern Ireland STAR SDH Network—NISTAR", M. Andrews et al, *British Telecommunications Engineering*, vol. 12, Oct. 1993, pp. 207–215.

"Network Synchronization System for DDX–2", T. Egawa et al, *Review of the Electrical Communication Laboratories*, vol. 25, Nos. 7–8, Jul.–Aug. 1977, pp. 717–729.

*Primary Examiner*—Dang Ton
*Attorney, Agent, or Firm*—Ware, Fressola, Van Der Sluys & Adolphson LLP

[57] ABSTRACT

In synchronous digital communication systems using a synchronization quality marker (SSM), timing loops can be created. To avoid such timing loops, a synchronous digital communication system is provided having network elements (NE11, . . . , NE33) in which two classes (top, bottom) are defined for interface units ($S_1, \ldots, S_x, \ldots, S_{X+i}$).

3 Claims, 2 Drawing Sheets

SYNCHRONOUS DIGITAL COMMUNICATION SYSTEM WITH A HIERARCHICAL SYNCHRONIZATION NETWORK

TECHNICAL FIELD

The present invention relates to a synchronous digital communication system with a number of network elements each having a plurality of interface units and with at least one transmission medium whereby the network elements are interconnected and to a network element with a plurality of interface units for a synchronous digital communication system.

BACKGROUND OF THE INVENTION

A synchronous digital communication system operates, for example, according to a standard for synchronous digital hierarchy (SDH/SONET standard) as set forth, for example, in ANSI T1.105-1991 entitled "Digital Hierarchy-Optical Interface Rates and Formats Specifications (SONET)". In such a digital transmission system, individual network elements are interconnected by different transmission media (e.g., copper cables, optical fiber waveguides, or radio links).

The connection between a network element and a transmission medium is provided by interface units ("network node interfaces"), which are known, for example, from ITU-T Recommendations G.703 and G.957. Recommendation G.703 specifies electrical characteristics of such interface units, and Recommendation G.957 specifies optical characteristics of such units. In an interface unit connected to an optical fiber waveguide, incoming optical signals, for example, are converted to electric signals by an optical-to-electrical transducer.

A network element is, for example, an exchange for a public switched telephone network, or a cross-connect or an add/drop multiplexer. A switching principle used in the exchange requires that all exchanges in the system operate synchronously. A general account of how exchange can be synchronized is given in an article by W. E. Powell et.al, "Synchronization and Timing of SDH Networks", Electrical Communication (Alcatel), 4th Quarter, 1993, pages 349 to 358.

In that article, two techniques for synchronizing the network elements are mentioned: master-slave synchronization and mutual synchronization.

The master-slave technique applies a unique primary reference clock for synchronization of a first hierarchical level of nodes. These nodes give their derived clocks to the next level nodes, and so on. In the mutual synchronization technique, all nodes are at a peer level interconnected by the existing digital links. Each node calculates a mean phase value of the incoming clocks and its own internal clock.

The master-slave technique thus uses a hierarchical synchronization system. In a system according to the synchronous digital hierarchy (SDH) or Sonet standard, a frame is defined which has an area referred to as "section overhead" (SOH) for SDH, in a multiplex section. In this SOH, a synchronization quality marker is transmitted, for which bits 5 to 8 of the S1 byte are allocated (see, for example, ITU-T Recommendation G.707, G.708, or Similarly, according to Committee T1-Telecommunications sponsored by the Alliance for Telecommunications Industry Solutions (formerly the Exchange Carriers Standards Association), G.709).

This synchronization quality marker indicates a quality class of a transmitted standard reference clock and provides a powerful autonomous capability to enhance the management of synchronization quality. The synchronization quality marker is generally called "synchronization status message" and will hereinafter be referred to as SSM. Bits 5 to 8 of the S1 (Z1) byte define, among other things, standard reference clocks according to ITU-T Recommendations G.811 and G.812 or a "do not use for synchronization" message, henceforth called DNU.

From a working document by B. Neihoff, "More on Synchronization Status Message Problems", ETSI TM3/WG6, Working Document 22, Oslo, 25–29 Oct. 1993, it is known that problems may be encountered in the use of SSMs. These include timing loops, which are created if, as shown in FIG. 2 of that document, a network element (SDXC) loses its selected reference clock source and selects another reference clock source with the aid of a selection procedure (synchronization source selection algorithm, SSSA). It is also mentioned that such timing loops can be created in any network configuration where two bidirectional SSM paths terminate and are generated in the same network element. To solve the problem, the working document proposes to define enable/disable functions.

DISCLOSURE OF INVENTION

It is an object of the invention to provide another in which no timing loops can be created. A digital communication system It is another object of the invention to provide a network element for such a communication system. According to a first aspect of the present invention, a synchronous digital communication system includes a number of network elements each having a plurality of interface units and interconnected with at least one transmission medium, characterized in that the interface units of a network element are grouped in two classes whereby a synchronization hierarchy is determined.

In further accord with this first aspect of the present invention, each of the network elements comprises a selection unit and a control unit connected to the selection unit which are connected to the interface units of the first class, wherein the control unit evaluates synchronization quality markers arriving at the interface units, and selects one of the interface units as a clock reference source whose clock signal is applied via the selection unit to a clock generator, wherein the clock generator checks the clock signal and transfers it to the interface units, and wherein the control unit transfers one of the synchronization quality markers or a synchronization quality marker generated by it to the interface units of the second class.

According to a second aspect of the present invention, a network element for a synchronous digital communication system with a plurality of interface units is characterized in that the interface units are grouped in two classes, whereby a synchronization hierarchy is determined in the synchronous digital communication system.

In accordance with either or both of the first and second aspects of the present invention, the interface units of the first class are used as possible clock reference sources.

Similarly, according either to either or both of the first and second aspects of the present invention, the interface units of the second class ignore incoming synchronization signals.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
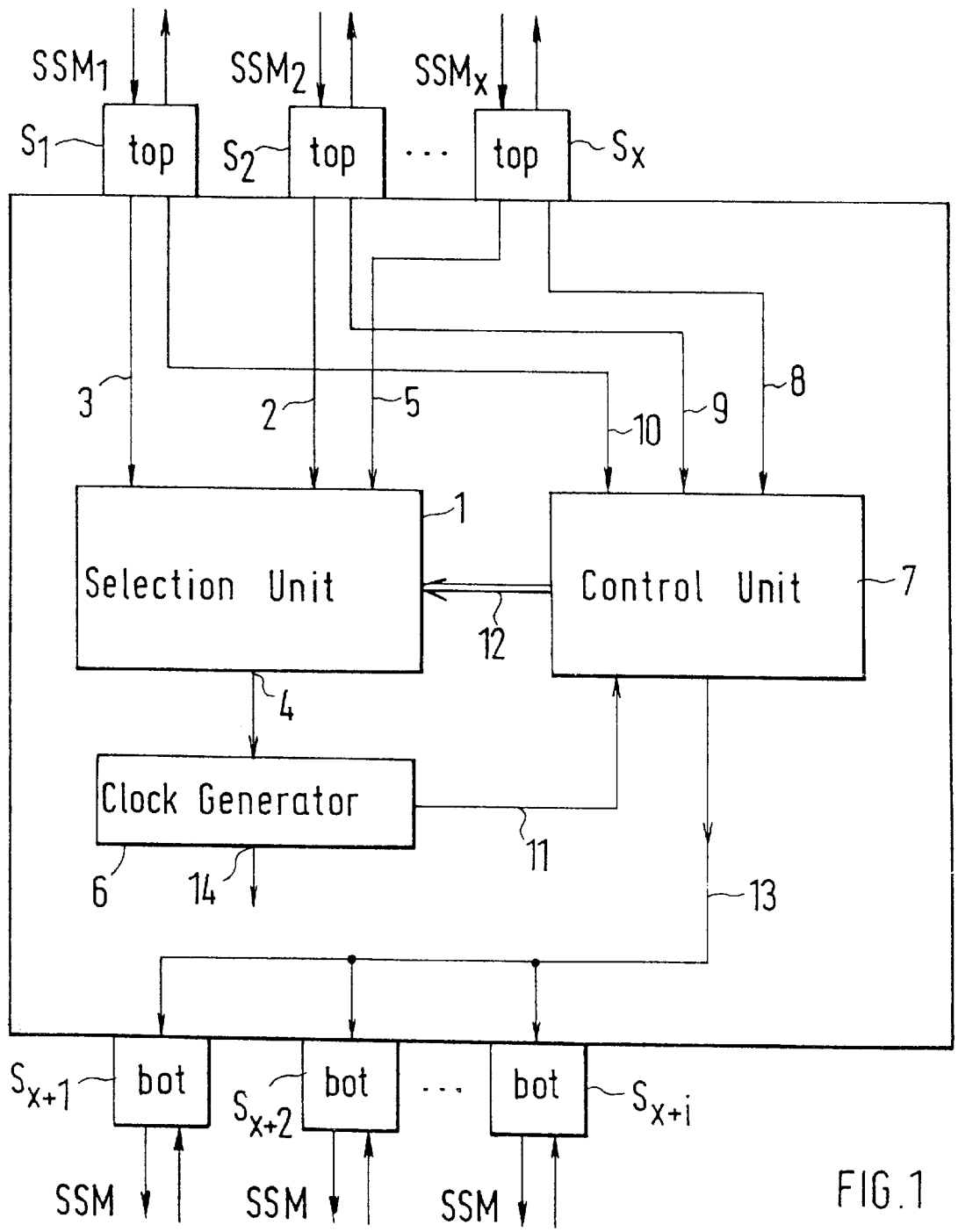
FIG. 1 shows a network element in which two priority classes are defined for interface units.

FIG. 1 shows a network element which forms part of a communication system operating according to the synchronous digital hierarchy (SDH) or synchronous optical network (SONET) standard, for example.

In such a digital communication system, the network elements are interconnected, for example, by copper cables and/or optical fiber waveguides. The network element, e.g., a cross-connect, has a number of interface units $S_1, \ldots, S_x, \ldots, S_{x+i}$.

Six interface units $S_1, S_2, S_x, S_{x+1}, S_{x+2}, S_{x+i}$ are shown in FIG. 1; three interface units $S_1, S_2, S_x$ are located on one side of the network element, hereinafter referred to as the "top side", and three interface units $S_{x+1}, S_{x+2}, S_{x+i}$ are located on the opposite side, hereinafter referred to as the "bottom side".

Each interface unit $S_1, S_2, S_x$ of the top side receives an SSM, designated $SSM_1, SSM_2$, and $SSM_x$, respectively. Each interface unit $S_1, S_2, S_x$ can also transmit an SSM, e.g., with the message DNU. In FIG. 1, the directions of the SSMs are indicated by arrows at the respective interface units $S_1, S_2, S_x$.

The network element further comprises a selection unit 1 containing a clock filter, (not shown) a clock generator 6, and a control unit 7. Each interface unit $S_1, S_2, S_x$ is connected to the selection unit 1 by a line 3, 2, 5. The selection unit is thus supplied with the clocks of STM-N (STS-3XN) signals arriving at the interface units $S_1, S_2, S_x$. In addition, each interface unit $S_1, S_2, S_x$ is connected to the control unit 7 by a line 10, 9, 8. Via these lines 10, 9, 8, the SSMs, i.e., $SSM_1, SSM_2$, and $SSM_x$, are fed to the control unit 7. The control unit 7 is, in turn, connected to the selection unit 1 by a control line 12, and to the clock generator 6 by a line 11. The selection device 1 is connected to the clock generator 6 by a line 4.

The control unit 7 is connected to the interface units $S_{x+1}, S_{x+2}, S_{x+i}$ of the bottom side by a line 13. An output 14 of the clock generator 6 provides the clock signal which is transferred to other network elements. To this end, the output 14 is connected to each of the interface units $S_1, \ldots, S_x, \ldots, S_{x+i}$; to simplify the illustration, this is indicated in FIG. 1 by an arrow at the output 14.

Regarding the functions of the individual parts:

The clock filter in the selection unit 1 is specified in ITU-T Recommendation G.812 or G.81s and is designed to filter out timing impairments (jitter and wander). Another function of the clock filter is to keep the frequency of its output signal as constant as possible if its input signal has failed.

The control unit 7 evaluates the incoming $SSM_1, SSM_2, SSM_x$ and determines one interface unit $S_1, S_2, S_x$ therefrom as a clock reference source. The selection unit 1 is then controlled by the control unit 7 in such a way as to transfer the clock signal from the clock reference source to the clock generator 6. The clock generator 6 is, for example, a phase-locked loop which, after synchronizing with the clock signal coming from the selection unit 1, transfers this clock signal via the output 14. If synchronization of the clock generator 6 is not possible, e.g., because the clock signal is accompanied by too much noise or has failed, the clock generator 6 will send a corresponding message to the control unit 7. Such a message causes the network element to enter a holdover mode, for example. The control unit 7 generates an SSM corresponding to the current status of the network element. This SSM can be one of the SSMs received by the interface units $S_1, S_2, S_x$ of the top side, i.e., $SSM_1, SSM_2$, or $SSM_x$. However, it can also be a new SSM generated by the control unit 7.

The interface units $S_{x+1}, S_{x+2}, S_{x+i}$ of the bottom side transfer the respective selected or generated SSM, while incoming SSMs are ignored. At these interface units $S_{x+1}, S_{x+2}, S_{x+i}$, too, the directions of the SSMs are indicated by arrows. In this network element, two classes (top, bottom) are defined for the interface units $S_1, \ldots, S_x, \ldots, S_{x+i}$: The interface units $S_1, S_2, S_x$ of the top side are grouped in the "top" class, and the interface units $S_{x+1}, S_{x+2}, S_{x+i}$ of the bottom side in the "bottom" class. The classes "top" and "bottom" (abbreviated "top" and "bottom") are written in the blocks representing the interface units in FIG. 1.

The interface units $S_1, S_2, S_x$ of the "top" class represent possible clock reference sources, from which one is selected by the control unit 7. This means that the interface units $S_1, S_2, S_x$ of this "top" class are connected to interface units of one or more other network elements whose SSMs are accepted for synchronization in principle. The interface units $S_{x+1}, S_{x+2}, S_{x+i}$ of the "bottom" class, as mentioned, ignore incoming SSMs, i.e., SSMs arriving from other network elements are not used for synchronization.

With such network elements as just described, a synchronization network can also be created in a nonhierarchical communication and switching system. By defining the classes "top, bottom" of an interface unit, it can be determined whether the network element may synchronize another network element or not.

Figure 2:
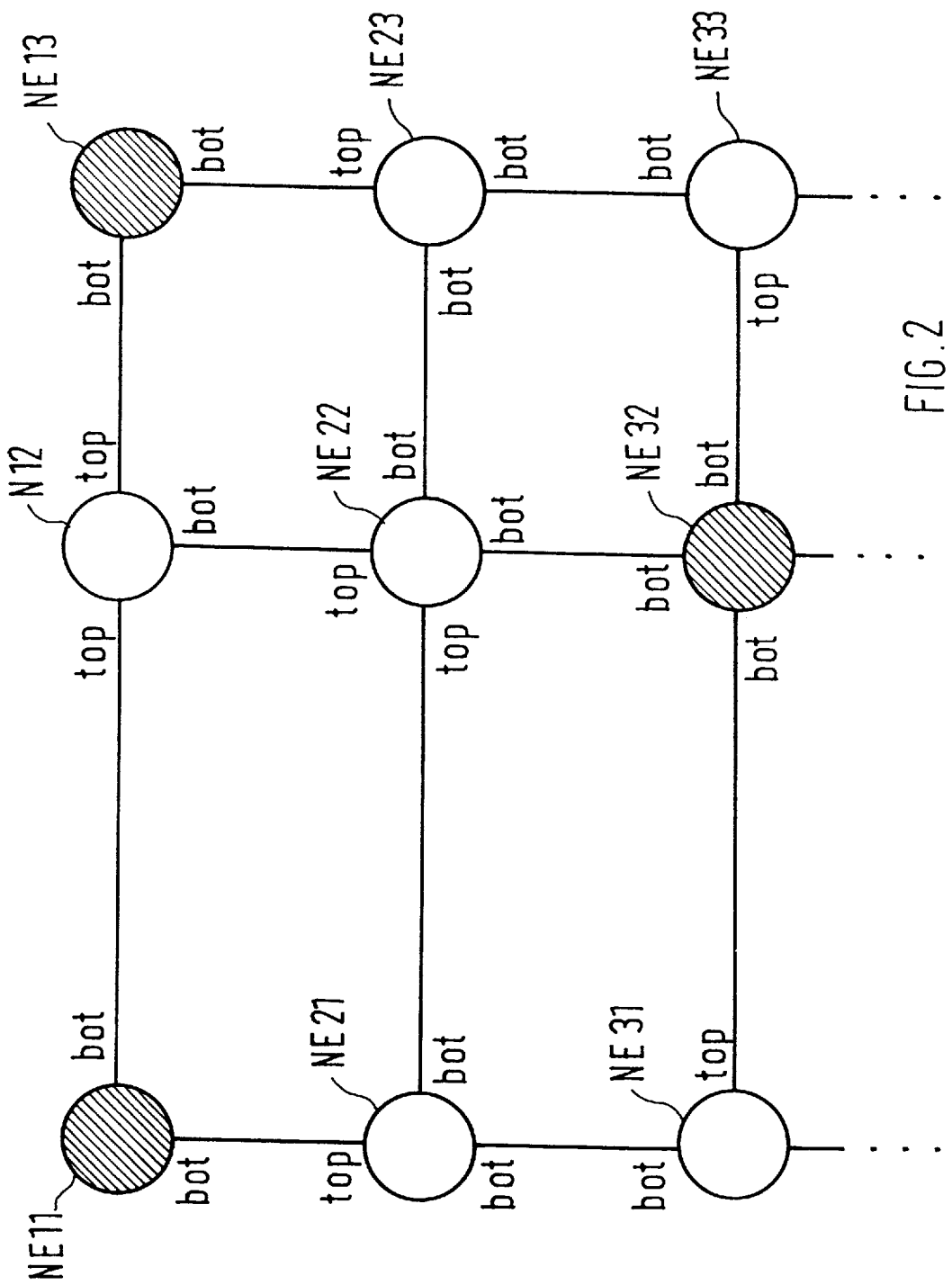
FIG. 2 shows a digital communication system with novel network elements.

FIG. 2 shows an exemplary hierarchical synchronization network with nine network elements NE11, . . . , NE33. These network elements NE11, . . . , NE33 are shown in the form of a grid (3×3 matrix), with the grid points representing the idealized geographical locations of the network elements NE11, . . . , NE33, and the grid lines representing the cable or radio links between the network elements. At the network elements NE11, NE13, NE32, a reference clock is fed into the hierarchical synchronization network. The reference clock ("master clock") is generated by a reference clock source, e.g., a cesium clock, which has a clock stability of $10^{-11}$. In FIG. 2 the network elements NE11, NE13, NE32 are shown as filled circles, and the remaining network elements NE12, NE21, . . . , NE31, NE33, which have no reference clock source, as unfilled circles. At the individual network elements NE11, . . . , NE33, the classes "top" and "bottom" are indicated.

The network elements NE11, NE13, NE32 have only interface units of the "bottom" class; they cannot be synchronized by other network elements.

The network elements NE21 accepts only a clock signal coming from the network element NE11 ("top" class) and ignores SSMs coming from the network elements NE22, NE31 ("bottom" class).

The other synchronization facilities for the individual network elements are apparent from FIG. 2, so they need not be explained here.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A synchronous digital communication system with a number of network elements (NE11, . . . , NE33) each having a plurality of interface units ($S_1, \ldots, S_x, \ldots, S_{x+i}$) for interfacing with neighboring network elements, and with at least one transmission medium whereby the network elements (NE11, . . . . , NE33) are interconnected for mutual synchronization at a peer level according to a selection criterion transmitted as part of synchronous digital signals including clock signals interchanged between said neighboring network elements via said transmission medium, characterized in that the interface units ($S_1, \ldots, S_x, \ldots, S_{x+i}$) of a network element (NE11, . . . , NE33) are grouped in two classes (top, bottom) defining a synchronization hierarchy at said peer levels, in that the interface units ($S_1, \ldots, S_x$) of a first class (top) are by definition possible clock reference sources, for selection according to said selection criterion, and in that the interface Units ($S_{x+1}, \ldots, S_{x+i}$) of a second class (bot) by definition cannot be used as said possible clock reference sources.

2. The synchronous digital communication system as claimed in claim 1, characterized in that each of the network elements (NE11, . . . , NE33) comprises a selection unit (1) and a control unit (7) connected to the selection unit (1), which are connected to the interface units ($S_1, \ldots, S_x$) of the first class (top), that the control unit (7) evaluates said selection criterion comprising synchronization quality markers ($SSM_1, \ldots, SSM_x$) arriving at the interface units ($S_1, \ldots, S_x$), and selects one of the interface units ($S_1, \ldots, S_x, \ldots, S_{x+i}$) as a clock reference source, whose clock signal is applied via the selection unit (1) to a clock generator (6), that the clock generator (6) checks the clock signal and transfers the clock signal to the interface units ($S_1, \ldots, S_x, \ldots, S_{x+i}$), and that the control unit (7) transfers one of the synchronization quality markers ($SSM_1, \ldots, SSM_x$) or a synchronization quality marker generated by the control unit to the interface units ($S_{x+i}, \ldots, S_{x+i}$) of the second class (bot).

3. A network element for use with a plurality of network elements in a synchronous digital communication system in which mutual synchronization of the network elements is carried out at a peer level according to a selection criterion transmitted as part of synchronous digital signals interchanged between neighboring network elements via a transmission medium, said network element having a plurality of interface units ($S_1, \ldots, S_x, \ldots, S_{x+i}$) for interfacing with said neighboring a network elements, characterized in that the interface units ($S_1, \ldots, S_x, \ldots, S_{x+i}$) are grouped in two classes (top, bottom) defining a synchronization hierarchy at said peer level in the synchronous digital communication system, in that the interface units ($S_1, \ldots, S_x$) of a first class (top) are defined as possible clock reference sources for selection, according to said selection criterion, and in that the interface units ($S_{x+1}, \ldots, S_{x+i}$) of a second class (bot) by definition cannot be used as said possible clock reference sources.

* * * * *

UNITED STATES PATENT AND TRADEMARK OFFICE
CERTIFICATE OF CORRECTION

PATENT NO. : 5,886,996
DATED : March 23, 1999
INVENTOR(S) : Michael Wolf

It is certified that error appears in the above-indentified patent and that said Letters Patent is hereby corrected as shown below:

At column 5, line 15 (claim 1, line 14), "levels" should be --level--.

At column 5, line 18 (claim 1, line 17), "Units" should be --units--.

At column 6, line 8 (claim 2, line 17), "$S_{x+i}$," (first occurrence) should be --$S_{x+1}$,--.

At column 6, line 18 (claim 3, line 9), after "neighboring" delete "a".

Signed and Sealed this

Sixteenth Day of November, 1999

Attest:

Q. TODD DICKINSON

Attesting Officer

Acting Commissioner of Patents and Trademarks